United States Patent
Cunha et al.

(10) Patent No.: US 9,482,432 B2
(45) Date of Patent: Nov. 1, 2016

(54) GAS TURBINE ENGINE COMBUSTOR WITH INTEGRATED COMBUSTOR VANE HAVING SWIRLER

(71) Applicants: Frank J. Cunha, Avon, CT (US);
Nurhak Erbas-Sen, Manchester, CT (US)

(72) Inventors: Frank J. Cunha, Avon, CT (US);
Nurhak Erbas-Sen, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 1045 days.

(21) Appl. No.: 13/627,722

(22) Filed: Sep. 26, 2012

(65) Prior Publication Data
US 2014/0338336 A1    Nov. 20, 2014

(51) Int. Cl.
| | | |
|---|---|---|
| F23R 3/28 | (2006.01) | |
| F23R 3/26 | (2006.01) | |
| F23R 3/04 | (2006.01) | |
| F01D 9/06 | (2006.01) | |

(Continued)

(52) U.S. Cl.
CPC .............. *F23R 3/286* (2013.01); *F01D 9/023* (2013.01); *F01D 9/065* (2013.01); *F23R 3/04* (2013.01); *F23R 3/16* (2013.01); *F23R 3/26* (2013.01); *F05D 2260/202* (2013.01); *F23R 2900/00018* (2013.01); *F23R 2900/03044* (2013.01); *Y02T 50/676* (2013.01)

(58) Field of Classification Search
CPC ..................... F01D 9/00–9/065; F01D 9/023; F01D 9/041; F01D 5/18; F01D 5/186; F01D 5/187; F02C 7/18; F02C 7/185; F23R 3/002; F23R 3/04; F23R 3/34; F23R 3/346; F23R 3/12; F23R 3/20; F23R 3/26; F23R 3/286; F23R 3/16; F23R 2900/03044; F23R 2900/00018; F05D 2240/121; F05D 2240/12; F23D 14/26; F23D 2900/14701; Y02T 50/676
USPC .................................................... 60/737, 524
See application file for complete search history.

(56) References Cited

U.S. PATENT DOCUMENTS

| | | | | |
|---|---|---|---|---|
| 2,592,748 | A * | 4/1952 | Sedille ....................... | F23R 3/16 |
| | | | | 110/104 R |
| 2,780,060 | A * | 2/1957 | Griffith ..................... | F02C 7/18 |
| | | | | 60/752 |
| 3,316,714 | A * | 5/1967 | Smith et al. .................... | 60/752 |

(Continued)

FOREIGN PATENT DOCUMENTS

| | | |
|---|---|---|
| DE | 102010020389 | 11/2011 |
| DE | 102010021997 | 12/2011 |

(Continued)

OTHER PUBLICATIONS

EP search report for EP13866016.2 dated Mar. 3, 2016.

*Primary Examiner* — Phutthiwat Wongwian
*Assistant Examiner* — Alain Chau
(74) *Attorney, Agent, or Firm* — O'Shea Getz P.C.

(57) ABSTRACT

A combustor section is provided for a gas turbine engine. The combustor section may include an outer liner panel, an inner liner panel and a bulkhead, which is arranged with the outer and the inner liner panels to form an annular combustion chamber. The combustor section may also include a swirler assembly and a combustor vane. The swirler assembly may be configured with the bulkhead. The combustor vane may extend at least partially into said combustion chamber, wherein the combustor vane is circumferentially aligned with the swirler assembly.

17 Claims, 10 Drawing Sheets

(51) Int. Cl.
*F23R 3/16* (2006.01)
*F01D 9/02* (2006.01)

(56) References Cited

U.S. PATENT DOCUMENTS

| | | | |
|---|---|---|---|
| 3,355,884 A * | 12/1967 | Bill et al. | 60/743 |
| 3,374,624 A * | 3/1968 | Coplin | 60/752 |
| 3,433,015 A * | 3/1969 | Sneeden | 60/804 |
| 3,608,310 A * | 9/1971 | Vaught | F01D 9/023 60/752 |
| 4,653,279 A | 3/1987 | Reynolds | |
| 4,733,538 A * | 3/1988 | Vdoviak | F01D 9/023 60/752 |
| 4,992,025 A * | 2/1991 | Stroud et al. | 416/97 R |
| 5,113,648 A | 5/1992 | Shekleton et al. | |
| 5,131,221 A | 7/1992 | Shekleton | |
| 5,207,064 A * | 5/1993 | Ciokajlo | F23R 3/34 60/737 |
| 5,220,795 A | 6/1993 | Dodds et al. | |
| 5,239,818 A * | 8/1993 | Stickles et al. | 60/804 |
| 5,261,223 A | 11/1993 | Foltz | |
| 5,735,681 A | 4/1998 | Cheng | |
| 5,879,148 A | 3/1999 | Cheng et al. | |
| 5,997,595 A | 12/1999 | Yokohama et al. | |
| 6,099,251 A * | 8/2000 | LaFleur | 416/97 R |
| 6,101,814 A | 8/2000 | Hoke et al. | |
| 6,105,372 A | 8/2000 | Mandai et al. | |
| 6,164,912 A * | 12/2000 | Tabbita et al. | 416/97 R |
| 6,205,789 B1 | 3/2001 | Patterson et al. | |
| 6,247,310 B1 | 6/2001 | Norris et al. | |
| 6,334,297 B1 * | 1/2002 | Dailey et al. | 60/785 |
| 6,408,629 B1 | 6/2002 | Harris et al. | |
| 6,513,331 B1 | 2/2003 | Brown et al. | |
| 6,536,207 B1 | 3/2003 | Kamen et al. | |
| 6,543,233 B2 | 4/2003 | Young et al. | |
| 6,553,767 B2 | 4/2003 | Farmer et al. | |
| 6,655,149 B2 | 12/2003 | Farmer et al. | |
| 6,705,081 B2 | 3/2004 | Kamen et al. | |
| 6,829,897 B2 | 12/2004 | Moriya et al. | |
| 6,854,258 B2 | 2/2005 | Moriya et al. | |
| 7,007,470 B2 | 3/2006 | Langenfeld et al. | |
| 7,111,460 B2 | 9/2006 | Jensen et al. | |
| 7,308,787 B2 | 12/2007 | LaRocque et al. | |
| 7,310,945 B2 | 12/2007 | Gurski et al. | |
| 7,373,772 B2 | 5/2008 | Simons et al. | |
| 7,654,084 B2 | 2/2010 | Jensen et al. | |
| 7,699,583 B2 * | 4/2010 | Cunha | 416/97 R |
| 7,726,131 B2 | 6/2010 | Sze et al. | |
| 7,870,736 B2 | 1/2011 | Homitz et al. | |
| 7,934,926 B2 | 5/2011 | Kornbluth et al. | |
| 8,006,511 B2 | 8/2011 | Kamen et al. | |
| 8,028,529 B2 | 10/2011 | Venkataraman et al. | |
| 8,047,001 B2 * | 11/2011 | Beeck | F01D 5/18 415/116 |
| 8,069,676 B2 | 12/2011 | Kamen et al. | |
| 8,092,175 B2 | 1/2012 | Beeck et al. | |
| 8,176,739 B2 | 5/2012 | Evulet et al. | |
| 8,177,547 B2 | 5/2012 | Kostlin et al. | |
| 2002/0092302 A1 | 7/2002 | Johnson et al. | |
| 2007/0028624 A1 | 2/2007 | Hsieh et al. | |
| 2009/0081048 A1 | 3/2009 | Beeck et al. | |
| 2009/0266080 A1 * | 10/2009 | Pieussergues | F01D 9/023 60/746 |
| 2009/0317258 A1 * | 12/2009 | Tibbott et al. | 416/97 R |

FOREIGN PATENT DOCUMENTS

| | | |
|---|---|---|
| DE | 202010017464 | 1/2012 |
| EP | 2028344 | 2/2009 |
| EP | 2386797 | 11/2011 |
| WO | 0165100 | 9/2001 |

* cited by examiner

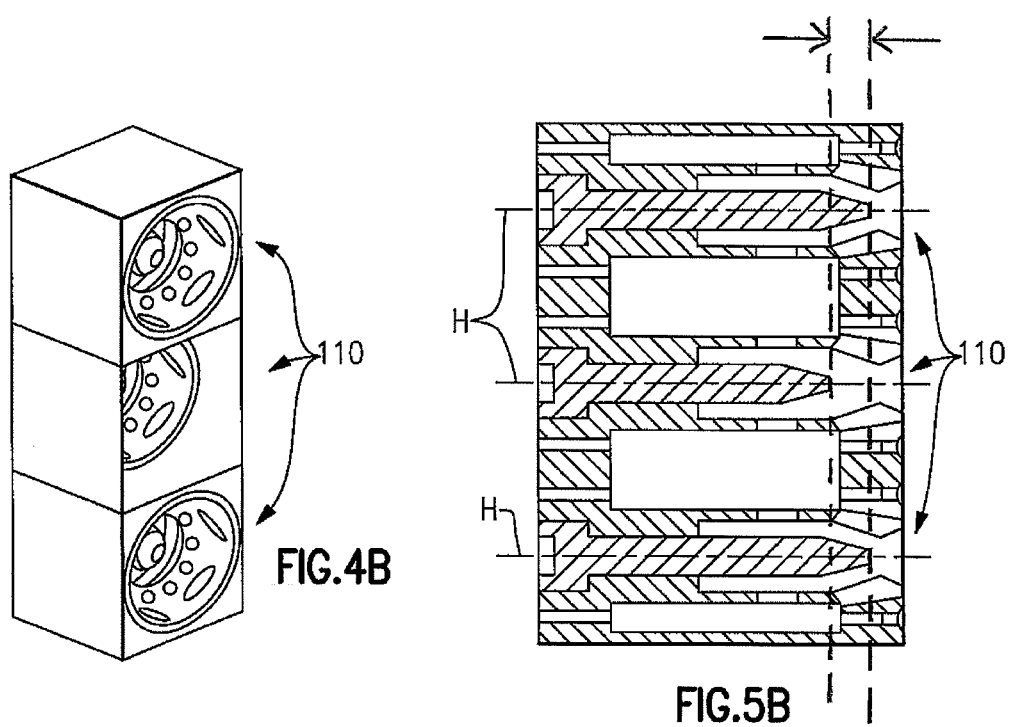

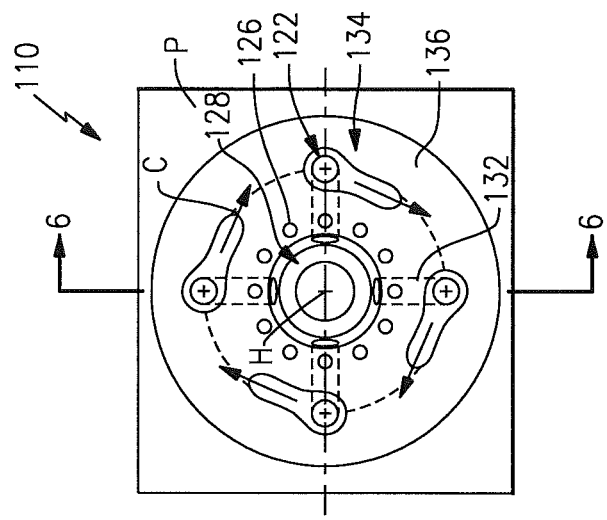
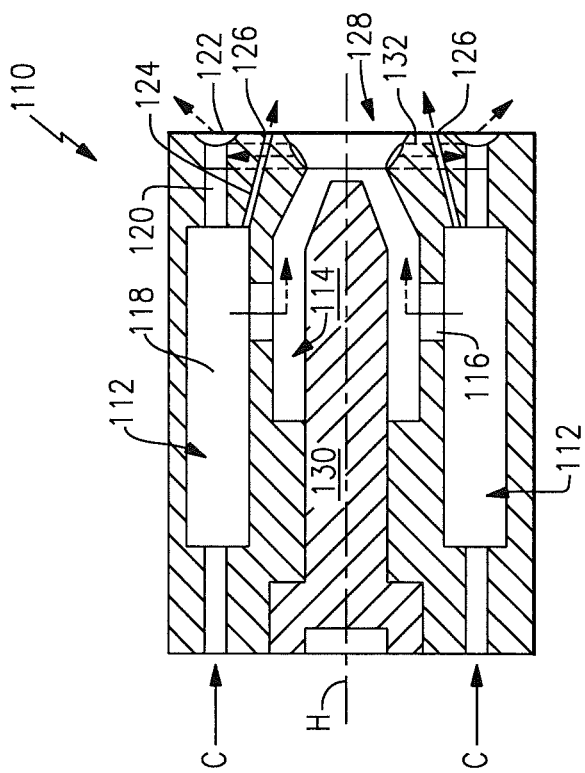

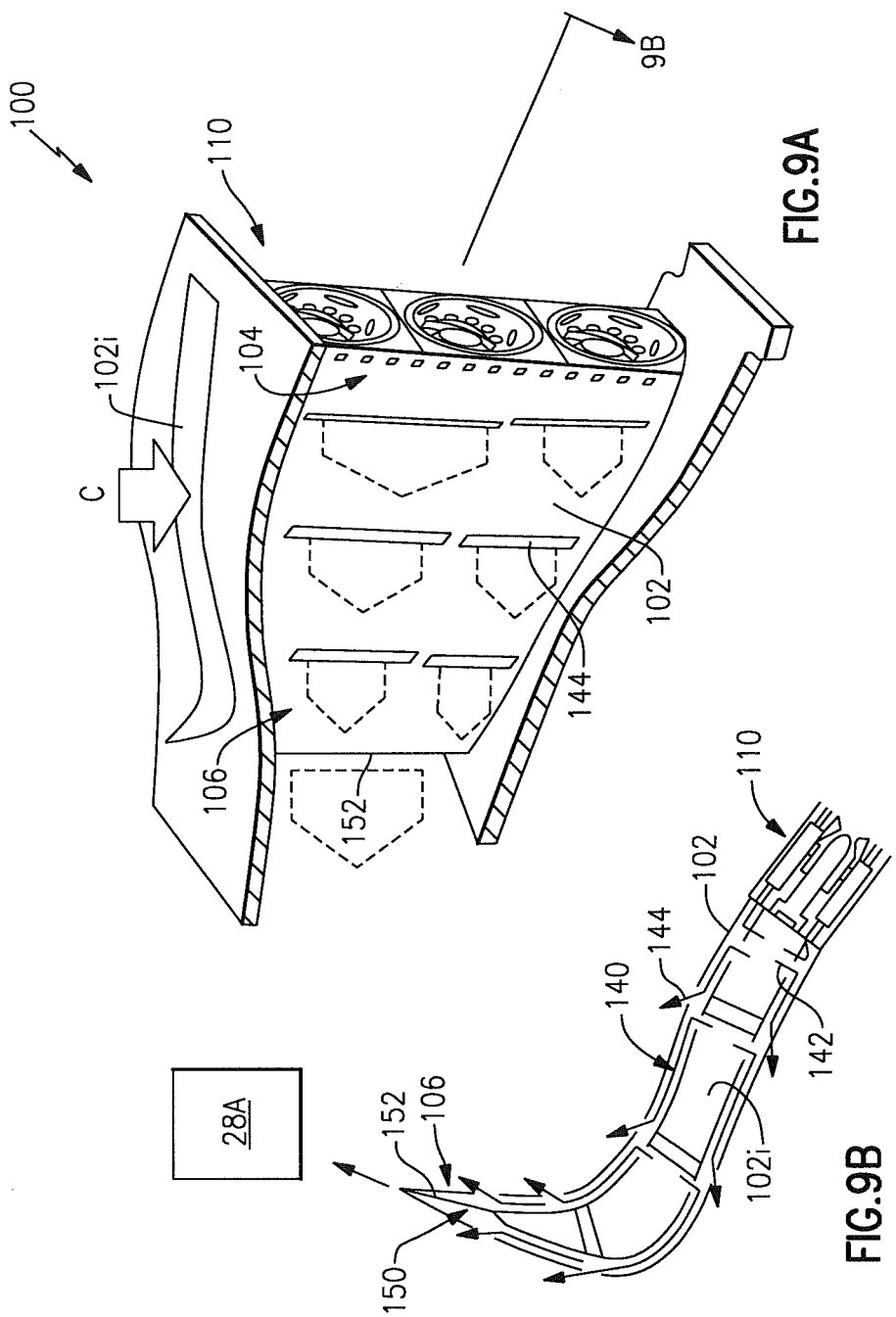

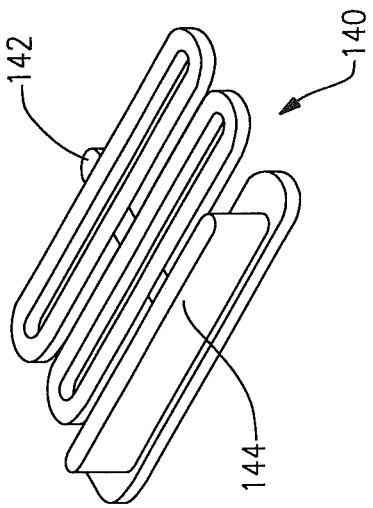
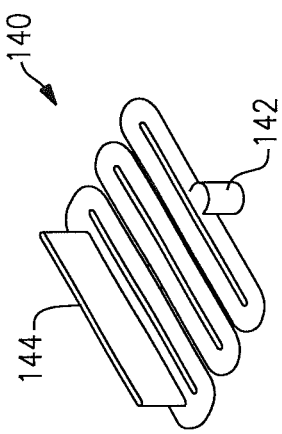
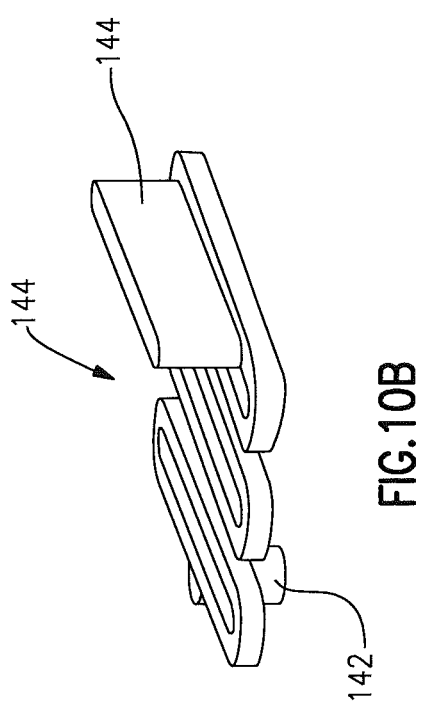

GAS TURBINE ENGINE COMBUSTOR WITH INTEGRATED COMBUSTOR VANE HAVING SWIRLER

BACKGROUND

The present disclosure relates to a gas turbine engine and, more particularly, to a combustor therefor.

Gas turbine engines, such as those which power commercial and military aircraft, include a compressor for pressurizing a supply of air, a combustor for burning a hydrocarbon fuel in the presence of the pressurized air, and a turbine for extracting energy from the resultant combustion gases. The combustor generally includes radially spaced apart inner and outer liners that define an annular combustion chamber therebetween. Arrays of circumferentially distributed combustion air holes penetrate multiple axial locations along each liner to radially admit the pressurized air into the combustion chamber. A plurality of circumferentially distributed fuel injectors axially project into a forward section of the combustion chamber to supply the fuel for mixing with the pressurized air.

Combustion of the hydrocarbon fuel in the presence of pressurized air may produce nitrogen oxide ($NO_X$) emissions that are subjected to excessively stringent controls by regulatory authorities, and thus may be sought to be minimized.

At least one known strategy for minimizing $NO_X$ emissions is referred to as rich burn, quick quench, lean burn (RQL) combustion. The RQL strategy recognizes that the conditions for $NO_X$ formation are most favorable at elevated combustion flame temperatures, such as when a fuel-air ratio is at or near stoichiometric. A combustor configured for RQL combustion includes three serially arranged combustion zones: a rich burn zone at the forward end of the combustor, a quench or dilution zone axially aft of the rich burn zone, and a lean burn zone axially aft of the quench zone.

During engine operation, a portion of the pressurized air discharged from the compressor enters the rich burn zone of the combustion chamber. Concurrently, the fuel injectors introduce a stoichiometrically excessive quantity of fuel into the rich burn zone. Although the resulting stoichiometrically fuel rich fuel-air mixture is ignited and burned to release the energy content of the fuel, $NO_X$ formation may still occur.

The fuel rich combustion products then enter the quench zone where jets of pressurized air radially enter through combustion air holes into the quench zone of the combustion chamber. The pressurized air mixes with the combustion products to support further combustion of the fuel with air by progressively deriching the fuel rich combustion products as they flow axially through the quench zone. The fuel-air ratio of the combustion products changes from fuel rich to stoichiometric, causing an attendant rise in the combustion flame temperature. Since the quantity of $NO_X$ produced in a given time interval increases exponentially with flame temperature, quantities of $NO_X$ may be produced during this initial quench process. As the quenching continues, the fuel-air ratio of the combustion products changes from stoichiometric to fuel lean, causing an attendant reduction in the flame temperature. However, until the mixture is diluted to a fuel-air ratio substantially lower than stoichiometric, the flame temperature remains high enough to generate quantities of $NO_X$.

Low NOx combustor designs stabilize the primary combustion zone with a swirling flow and cooling jets through combustion holes close to this zone. To assist in primary zone stabilization, the combustor configuration also may have a bulged contour. Subsequent to these designs, improved air-blast injectors with one or two rows of unopposed dilution jets were provided for rapid mixing. Trends to decrease residence time with further NOx reduction continued with increasingly strong dilution jets. From the data acquired to-date through engine testing, demonstration and certification requirements, the stability for primary zone combustion followed by (close to) stoichiometric combustion are directly related to (1) the mixing characteristics of fuel-air injectors, (2) aerodynamic contouring of the combustion chamber, and (3) the dilution jets.

Combustion processes with several stages of combustion are desirable; however, a minimum length for the combustor is required, which, in turn, may result in a relatively significant weight requirement. Dilution cooling/mixing jet configurations that radially penetrate into the mixing zone with sufficient strength may also result in a quasi-one-dimensional momentum for each dilution jet prior to onset of the desired counter-swirl effect of the two jets combined. This may result in an exit temperature profile with circumferentially peaks which may expose the turbine section to excessive temperatures.

SUMMARY

A combustor section for a gas turbine engine according to one disclosed non-limiting embodiment of the present disclosure includes a combustion chamber and a combustor vane which extends at least partially into the combustion chamber.

In a further embodiment of the foregoing embodiment, the combustor vane is located between an outer liner panel and an inner liner panel.

In a further embodiment of any of the foregoing embodiments, the combustor vane defines a length between 35%-65% of the combustion chamber.

In a further embodiment of any of the foregoing embodiments, the combustor vane includes a swirler.

In the alternative or additionally thereto, the foregoing embodiment includes the swirler is located through an outer airfoil wall surface between a leading edge and a trailing edge of the combustor vane.

In the alternative or additionally thereto, the foregoing embodiment includes the swirler is located along a leading edge thereof.

In the alternative or additionally thereto, the foregoing embodiment includes the swirler includes a multiple of supply air chambers.

In the alternative or additionally thereto, the foregoing embodiment includes each of the multiple of supply air chambers communicates with an annular inner jet compartment.

In the alternative or additionally thereto, the foregoing embodiment includes the annular inner jet compartment includes a convergent-divergent section.

In the alternative or additionally thereto, the foregoing embodiment includes a divergent portion of the convergent-divergent section communicates with a dilution passage.

In the alternative or additionally thereto, the foregoing embodiment includes the dilution passage communicates with a dilution hole.

In the alternative or additionally thereto, the foregoing embodiment includes the dilution hole is located within a tailored depression.

In the alternative or additionally thereto, the foregoing embodiment includes each of the multiple of supply air chambers communicates with at least one cooling hole located radially between the convergent section and the dilution hole.

In a further embodiment of any of the foregoing embodiments, the combustor vane is manufactured of a refractory metal core (RMC) material.

In the alternative or additionally thereto, the foregoing embodiment includes the combustor vane includes an RMC circuit along a main body thereof.

In the alternative or additionally thereto, the foregoing embodiment includes the combustor vane includes centerline RMC microcircuit with pedestals along a trailing edge thereof.

In the alternative or additionally thereto, the foregoing embodiment includes the combustor vane includes a multiple of swirlers stacked along a leading edge thereof.

A swirler for a combustion vane in a combustor section of a gas turbine engines according to another disclosed non-limiting embodiment of the present disclosure includes an annular inner jet compartment which defines a convergent-divergent section and a multiple of supply air chambers in communication with the annular inner jet compartment.

In a further embodiment of the foregoing embodiment, the convergent-divergent section is directed through a leading edge of a combustion vane.

In a further embodiment of any of the foregoing embodiments, the divergent portion of the convergent-divergent section communicates with a dilution passage, the dilution passage in communication with a dilution hole radially outboard of the annular inner jet compartment, the dilution hole located within a tailored depression.

A combustor section for a gas turbine engine according to another disclosed non-limiting embodiment of the present disclosure includes a combustor section having a combustor vane having at least one dilution hole.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 4B is a schematic perspective view of an array of swirlers according to another disclosed non-limiting embodiment;

FIG. 5B is a sectional view of the array of swirlers of FIG. 4B;

FIG. 6 is a schematic sectional view of one swirler;

FIG. 7 is a front view of the swirler of FIG. 6;

FIG. 9A is a perspective view of a combustor vane with a multiple of slot cooling RMC microcircuits along a main body thereof;

FIG. 9B is a sectional view of the combustor vane taken along line 9B-9B in FIG. 9A;

FIG. 10B is a perspective partial phantom view of one slot cooling RMC microcircuit from a first direction;

FIG. 10C is a perspective partial phantom view of one slot cooling RMC microcircuit from a second direction;

FIG. 10D is a perspective partial phantom view of one slot cooling RMC microcircuit from a second direction;

DETAILED DESCRIPTION

Figure 1:
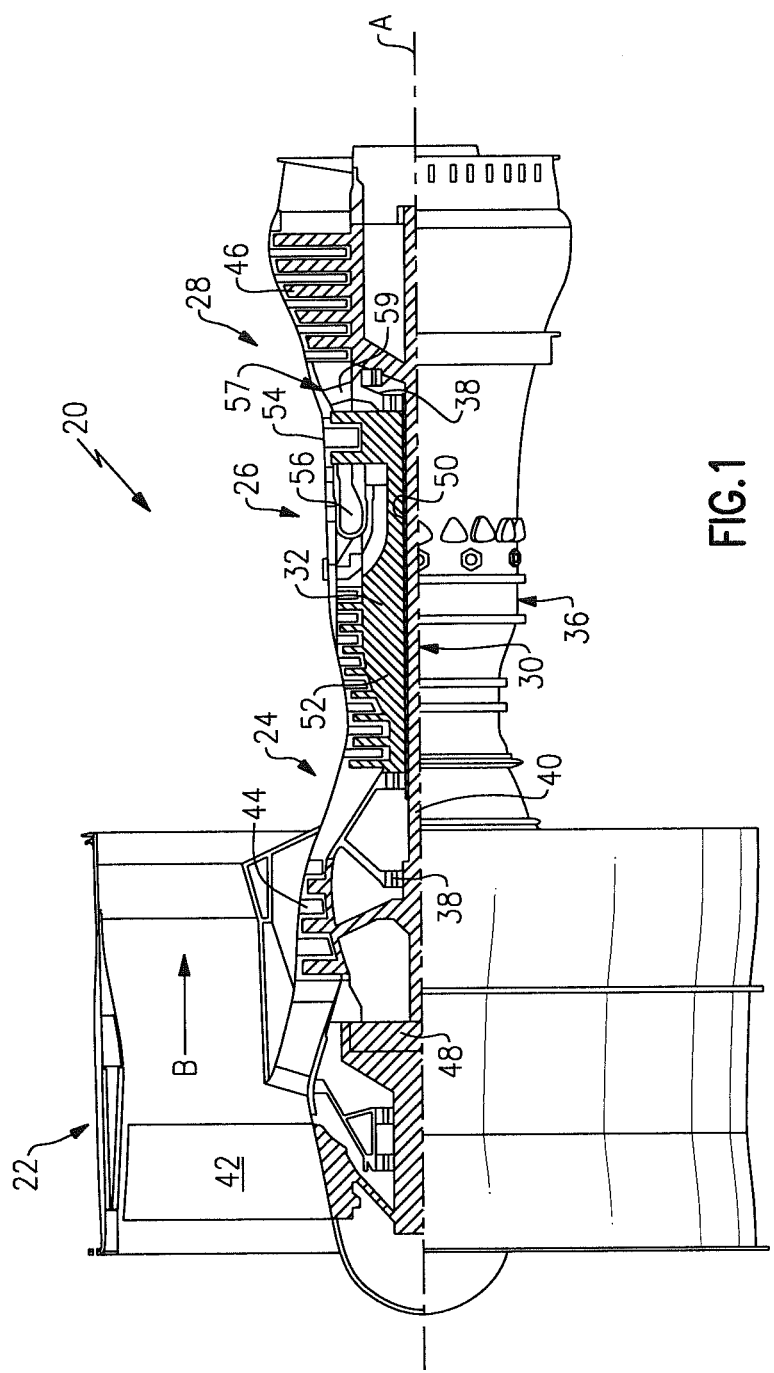
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines such as a three-spool (plus fan) engine wherein an intermediate spool includes an intermediate pressure compressor (IPC) between the LPC and HPC and an intermediate pressure turbine (IPT) between the HPT and LPT.

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor 44 ("LPC") and a low pressure turbine 46 ("LPT"). The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") and high pressure turbine 54 ("HPT"). A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the low pressure compressor 44 then the high pressure compressor 52, mixed with the fuel and burned in the combustor 56, then expanded over the high pressure turbine 54 and low pressure turbine 46. The turbines 54, 46 rotationally drive the respective low spool 30 and high spool 32 in response to the expansion.

The main engine shafts 40, 50 are supported at a plurality of points by bearing structures 38 within the static structure 36. It should be understood that various bearing structures 38 at various locations may alternatively or additionally be provided.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the low pressure compressor 44 and low pressure turbine 46 and render increased pressure in a fewer number of stages.

A pressure ratio associated with the low pressure turbine 46 is pressure measured prior to the inlet of the low pressure turbine 46 as related to the pressure at the outlet of the low pressure turbine 46 prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 44, and the low pressure turbine 46 has a pressure ratio that is greater than about 5 (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of "T"/518.7$^{0.5}$ in which "T" represents the ambient temperature in degrees Rankine. The Low Corrected Fan Tip Speed according to one non-limiting embodiment of the example gas turbine engine 20 is less than about 1150 fps (351 m/s).

Figure 2:
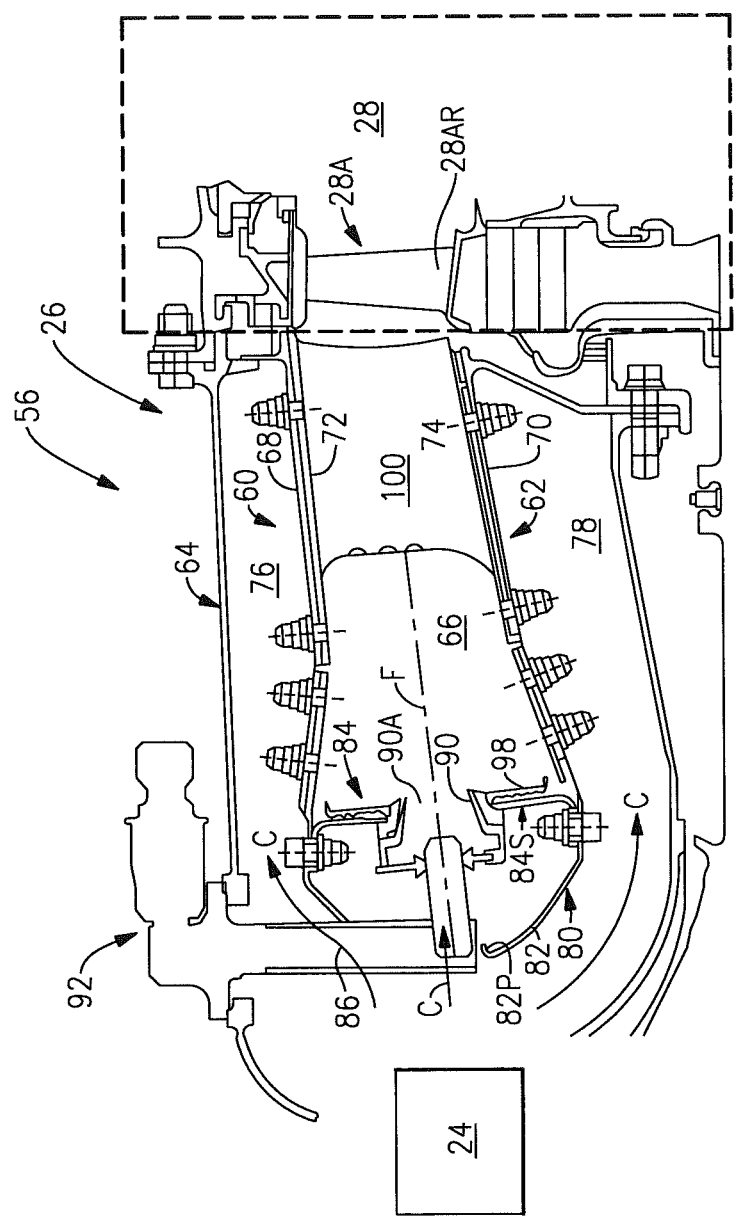
FIG. 2 is a partial longitudinal schematic sectional view of a combustor with integral combustor vanes that may be used with the gas turbine engine shown in FIG. 1.

With reference to FIG. 2, the combustor 56 generally includes a combustor outer liner 60 and a combustor inner liner 62. The outer liner 60 and the inner liner 62 are spaced inward from a diffuser case 64 such that a combustion chamber 66 is defined therebetween. The combustion chamber 66 is generally annular in shape and is defined between combustor liners 60, 62.

The outer liner 60 and the diffuser case 64 define an outer annular plenum 76 and the inner liner 62 and the case 64 define an inner annular plenum 78. It should be understood that although a particular combustor is illustrated, other combustor types with various combustor liner panel arrangements will also benefit herefrom. It should be further understood that the disclosed cooling flow paths are but an illustrated embodiment and should not be limited only thereto.

Figure 3:
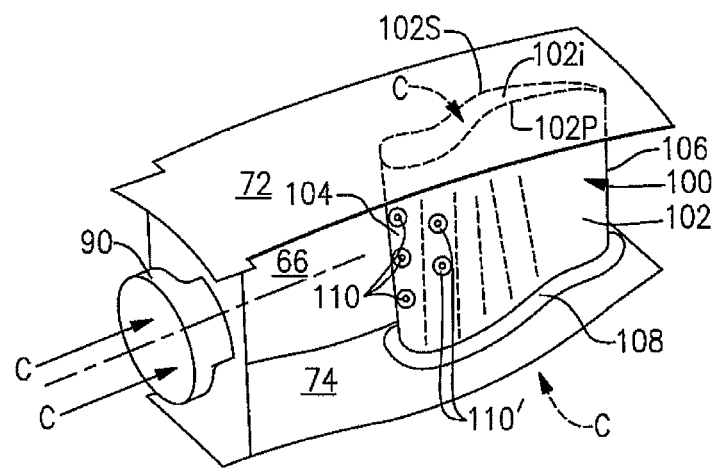
FIG. 3 is a schematic perspective view of the combustor with integral combustor vanes shown in FIG. 2.

Each liner 60, 62 generally includes a respective support shell 68, 70 that supports one or more respective liner panels 72, 74 mounted to a hot side of the respective support shell 68, 70. The liner panels 72, 74 define a liner panel array that may be generally annular in shape. Each of the liner panels 72, 74 may be generally rectilinear and manufactured of, for example, a nickel based super alloy or ceramic material (FIG. 3).

The combustor 56 includes a forward assembly 80 immediately downstream of the compressor section 24 (illustrated schematically) to receive compressed airflow therefrom. The forward assembly 80 generally includes an annular hood 82, a bulkhead assembly 84, a multiple of axial fuel nozzles 86 (one shown) and a multiple of swirler assemblies 90 (one shown) that define a central opening. The annular hood 82 extends radially between, and is secured to, the forwardmost ends of the liners 60, 62 and includes a multiple of circumferentially distributed hood ports 82P that accommodate the respective fuel nozzle 86 and introduces air into the forward end of the combustion chamber 66. The centerline of the fuel nozzle 86 is concurrent with the centerline F of the respective swirler assembly 90. Each swirler assembly 90 is circumferentially aligned with, and/or concentric to, one of the hood ports 82P to project through the bulkhead assembly 84. Each fuel nozzle 86 may be secured to the diffuser case 64 to project through one of the hood ports 82P and through the central opening 90A of the respective swirler assembly 90.

Each bulkhead assembly 84 includes a bulkhead support shell 84S secured to the liners 60, 62, and a multiple of circumferentially distributed bulkhead heatshields segments 98 secured to the bulkhead support shell 84S around the central opening 90A.

The forward assembly 80 directs a portion of the core airflow (illustrated schematically by arrows C) into the forward end of the combustion chamber 66 while the remainder enters the outer annular plenum 76 and the inner annular plenum 78. The multiple of axial fuel nozzles 86, swirler assemblies 90 and associated fuel communication structure defines a fuel injection system 92 (illustrated schematically) that supports combustion in the combustion chamber 66.

The combustor 56 further includes a multiple combustor vanes 100 integrated into the combustor 56 between the liner panels 72, 74 of respective liners 60, 62 (also illustrated in FIG. 3). The combustor vanes 100 extend at least partially into the combustion chamber 66—shown completely within the combustor 56 in the disclosed non-limited embodiment—the primary zone to perform combustor dilution/mixing requirements such that a turbine rotor assembly 28A (see FIG. 2) is the first stage immediately downstream of the combustor 56. That is, no first stage vanes, such as nozzle guide vanes, is required immediately downstream of the combustor 56 as the combustor vanes 100 provide the performance characteristics of a turbine first stage vane in terms of turbine flow metering and compressor cycle matching. In one disclosed, non-limiting embodiment the combustor vanes 100 define an axial length between 35%-65% of the combustion chamber 66. Moreover, the combustor vanes 100 may be positioned relative to the axial fuel nozzles 86 to block hot streaks from progressing into the turbine section 28.

The combustor vanes 100 may be arranged downstream and along the axis F of each of the multiple of axial fuel nozzles 86 between two opposed, generally planar liner panels 72, 74 (FIG. 3). The area between the combustor vanes 100 defines the throat area and thereby determines the combustor pressure ratio. It should be appreciated that the number of combustor vanes 100 may be equivalent or different than the number of fuel nozzles 86. The combustor vanes 100 facilitate a decrease in the overall length of the combustor section 26 and thereby the engine 20 as a result of improved mixing in the combustion chamber 66, and by elimination of conventional dilution holes and the elimination of separate first stage turbine vanes (e.g., nozzle guide vanes) in the turbine section 28.

With reference to FIG. 3, the combustor vanes 100 are defined by an outer airfoil wall surface 102 between a leading edge 104 and a trailing edge 106. The outer airfoil wall surface defines a generally concave shaped portion to form a pressure side 102P and a generally convex shaped portion forming a suction side 102S. A fillet 108 (only one shown) may be located between the airfoil wall surface 102 and the adjacent generally planar liner panels 72, 74 of respective liners 60, 62 between which the combustor vanes 100 may at least partially extend.

Figure 4A:
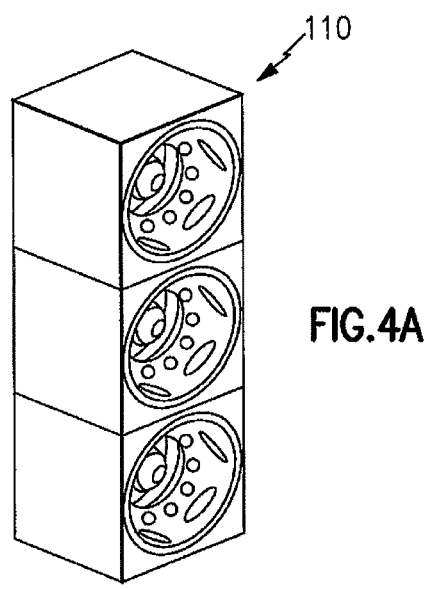
FIG. 4A is a schematic perspective view of an array of swirlers according to one disclosed non-limiting embodiment.
Figure 5A:
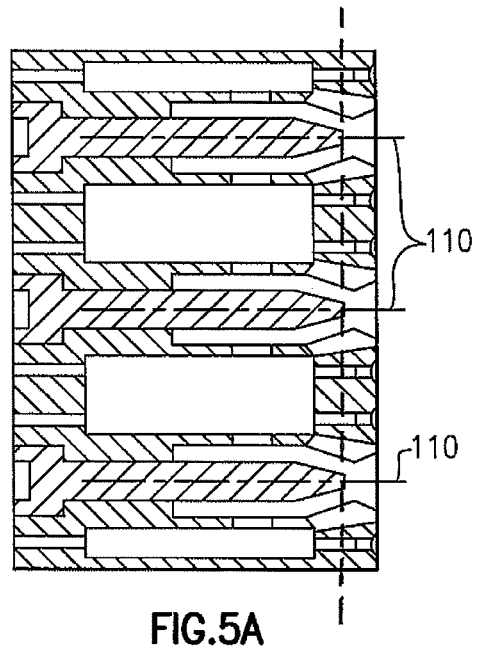
FIG. 5A is a sectional view of the array of swirlers of FIG. 4A.

The combustor vanes 100 each include a multiple of swirlers 110 integrated into and along the leading edge 104 (also shown in FIGS. 4A and 5A). The swirlers 110 may be assembled radially from an inner diameter toward an outer diameter of each combustor vane 100 to complete an integrated combustor vane leading edge assembly. For example only, the swirlers 110 may be separately manufactured then attached along the leading edge 104. The combustor vanes 100 each have a hollow interior 102i that communicates directly with both the inner and outer annular plenums 76, 78. This allows the flow of core airflow (illustrated schematically by arrows C) from the outer annular plenum 76 and/or the inner annular plenum 78, into the interior 102i, then out through the swirlers 110. The exiting air flow from the swirlers 110 generally opposes the combustor flow from the upstream swirler assembly 90.

Although three (3) swirlers 110 are stacked along the leading edge 104 in the disclosed non-limiting embodiment, it should be appreciated that any number may alternatively be provided. The various combustor vane 100 configurations described herein may use refractory metal core (RMC) material and manufacturing processes which are particularly suited for intricate and detailed cooling circuits as well as formation of the swirlers 110. It should be understood that other materials and manufacturing processes may alternatively or additionally utilized.

One or more of the multiple of swirlers 110 may alternatively or additionally be located along the outer airfoil wall surface 102 between the leading edge 104 and the trailing edge 106. (FIG. 3). Furthermore, the characteristics of the individual swirlers 110 may be controlled relative to the other swirlers 110. For example, one of the multiple of swirlers 110 may be axially displaced relative to the radially inner and radially outer swirlers 110 (FIGS. 4B and 5B).

With reference to FIG. 6, each of the swirlers 110 generally includes a multiple of supply air chambers 112 that communicate with an annular inner jet compartment 114 via one or more (FIGS. 5A, 5B) radial passageways 116. Each of the multiple of supply air chambers 112 include an expansion chamber 118 to facilitate pressure control to the multiple of radial passageways 116, a multiple of dilution passageways 120, each of which communicate with a respective dilution hole 122 (four shown; FIG. 7), and a multiple of cooling passageways 124, each of which communicate with a respective cooling hole 126 (twelve shown; FIG. 7). Alternatively, each expansion chamber 118 may communicate with a multiple of annular inner jet compartments 114 to facilitate a compact arrangement of multiple swirlers 110 in a stack (FIGS. 5A, 5B). It should be appreciated that although a particular number, size and orientation of passageways and holes are illustrated in the disclosed non-limiting embodiment, any number, size and orientation, various numbers, sizes and orientations may alternatively or additionally benefit herefrom.

The inner jet compartment 114 is defined in part by a convergent-divergent section 128 and a central support 130 defined along a central axis H. The inner jet compartment 114 also communicates with each of the multiple of dilution passageways 120 through a respective internal turning passage 132. Each internal turning passage 132 is a ninety (90) degree turning passage dedicated to each of the multiple of dilution passageways 120 that may originate in the divergence portion of the convergent-divergent section 128. Each dilution hole 122 is located within a tailored depression 134 (FIG. 7) on an outer surface 136 of the swirler 110 which may be a frustro-conical surface (FIGS. 4A and 4B). The tailored depression 134 may be a keyhole, oval or other directionally-shaped depression.

The number, location and/or size of the cooling holes 126 may be located, as required, to maintain metal temperatures within a material capability for location in the combustion chamber 66. Alternatively, or additionally thereto, a variety of applicable cooling and material technologies, e.g., supercooling channels, molybdenum based alloys, and other cooling features may further facilitate combustor vane 100 durability.

Airflow is communicated from the hollow interior 102i into the multiple of supply air chambers 112 for communication to the inner jet compartment 114, the dilution holes 122 and the cooling holes 126 through the respective dilution passageways 120 and cooling passageways 124. The inner jet compartment 114, the dilution holes 122 and the cooling holes 126 provide a non-reacting flow for mixture with a reacting flow in the combustion chamber 66. As utilized herein, the non-reacting flow is the airflow from the combustor vanes 100 while the reacting flow is the oncoming hot combustion gases from the upstream multiple of axial fuel nozzles 86 and swirler assemblies 90 (FIG. 3).

The combustor vanes 100 first come into contact with the oncoming hot combustion gases reacting flow at the leading edge 104. The swirlers 110 located in the leading edge 104 of the combustor vanes 100 quench the oncoming hot combustion gases to form a quench or dilution zone axially aft of the rich burn zone. The inner jet compartment 114 communication with each of the multiple of dilution passageways 120 in combination with the tailored depression 134 directs the non-reacting flow tangentially (FIG. 7) to modulate the mixing of the non-reacting flow with the oncoming hot combustion gases. The effective mixing provided by the swirlers 110 further minimizes $NO_X$ emissions.

The swirlers 110 (three shown) may be relatively arranged to further modulate mixing with the oncoming hot combustion gases. For example, a three swirler 110 array may be stacked along the leading edge 104 in the disclosed non-limiting embodiment. It should be appreciated that various numbers and various combinations of tailored swirlers 110 may be utilized to provide the desired dilution and mixing effects and characteristics such as size, angle, pitch and/or other characteristics may be tailored to provide a desired effect. For example only, the characteristics of the individual swirlers 110 and the array thereof may be tailored to generate a flat combustor exit profile, control combustion gas temperature, minimize residence time and/or minimize the local fuel rich zone to control smoke generation.

Figure 8:
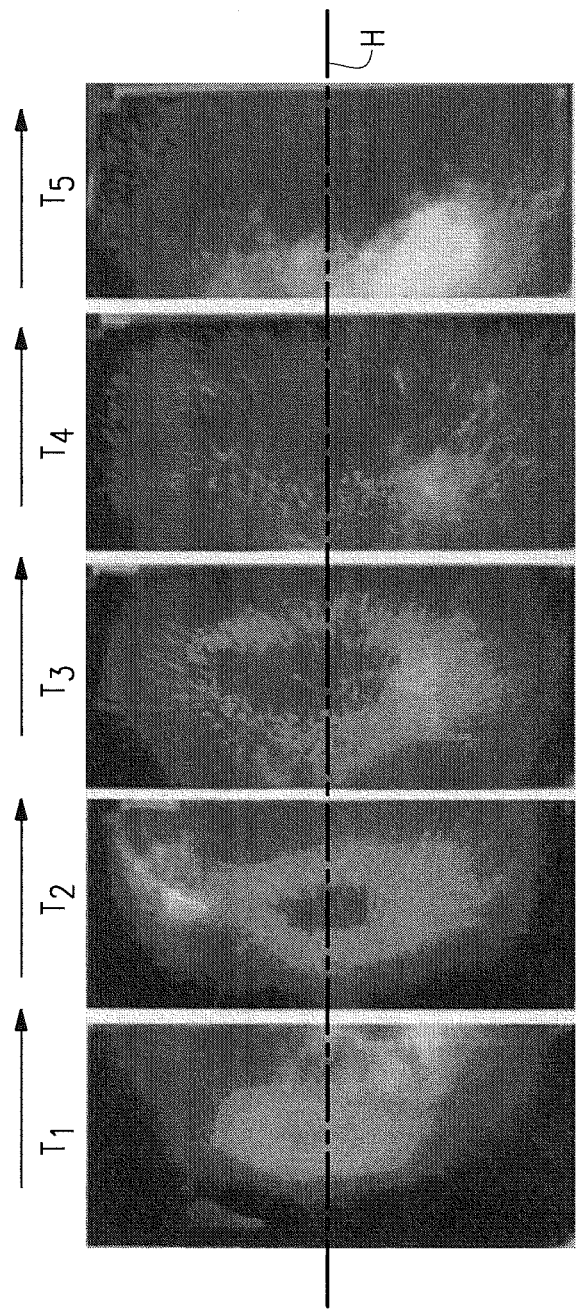
FIG. 8 is time lapsed view of a jet from one swirler.

The swirlers 110 replace the function of conventional dilution holes to modulate the mixing of the hot combustion gas reacting flow. The jet characteristics emerging from the leading edge 104 starts with a large concentration of flux at the inner radius, disperses, diffuses, and dilutes as required with increasing distance from the leading edge 104 (FIG. 8). This process occurs at every radially displaced swirlers 110 location to provide effective dilution characteristics with high swirl and corresponding three-dimensional mixing to control the dilution process in the combustion chamber 66. The degree of the swirl of the non-reacting flow in comparison to the degree of the swirl of the reacting flow is thereby balanced to create the desired dilution and mixing effects.

Figure 10A:
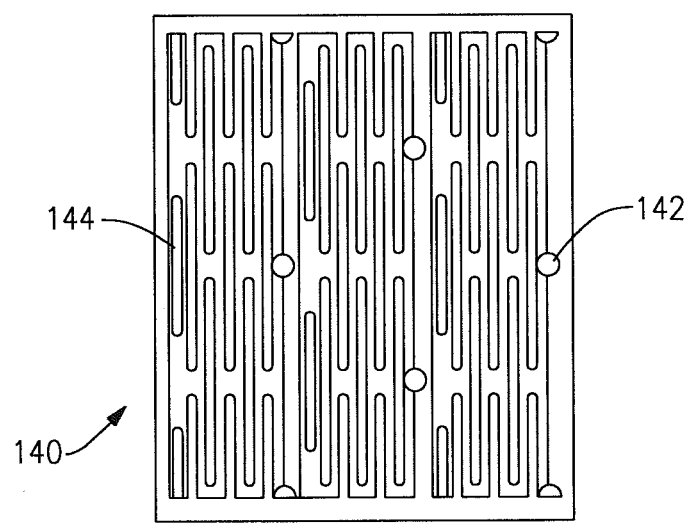
FIG. 10A is a schematic face view of the multiple of slot cooling RMC microcircuits.

With reference to FIGS. 9A and 9B, the outer airfoil wall surface 102 of the combustor vanes 100 aft of the leading edge 104 may be cooled by a multiple of RMC wall microcircuits 140 (also shown in FIGS. 10A-10C). Airflow is communicated from the hollow interior 102*i* through an inlet supply 142 to feed the RMC wall microcircuit 140. The RMC wall microcircuit 140 communicates with one or more slot film exits 144 which may be tailored to minimize film blow-off. It should be appreciated that any number of RMC wall microcircuits 140 may be utilized and the dimensions thereof tailored to the particular combustor vanes 100. Both cooling efficiency and slot film cooling are parameters that result in high cooling effectiveness for RMC microcircuit applications in the combustor vanes 100.

Figure 11:
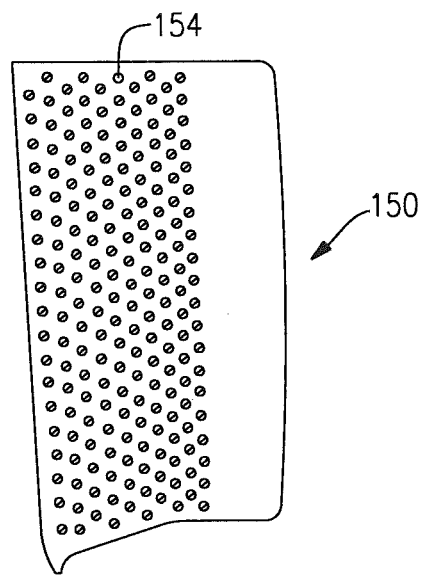
FIG. 11 is a schematic face view of a trailing edge cooling RMC microcircuits.

The trailing edge 106 of the combustor vanes 100 may be cooled with a centerline RMC microcircuit 150. The centerline RMC microcircuit 150 includes a passageway 152 which are supported by an array of pedestals 154 (FIG. 11). The array of pedestals 154 may be arranged to increase the durability of the first stage turbine blade 28A (illustrated schematically and in FIG. 2) through direction of the concentrated cooling efflux towards a root section 28AR to attenuate potential reactive hot spots (FIG. 2).

The predominant cooling mechanisms inherent to RMC microcircuit cooling are slot film cooling to attain maximum film coverage, and localized heat pick-up, usually denoted as a cooling efficiency. Both slot film cooling and cooling efficiency are parameters that result in high cooling effectiveness for a RMC microcircuit application in the combustor vanes 100.

Figure 12:
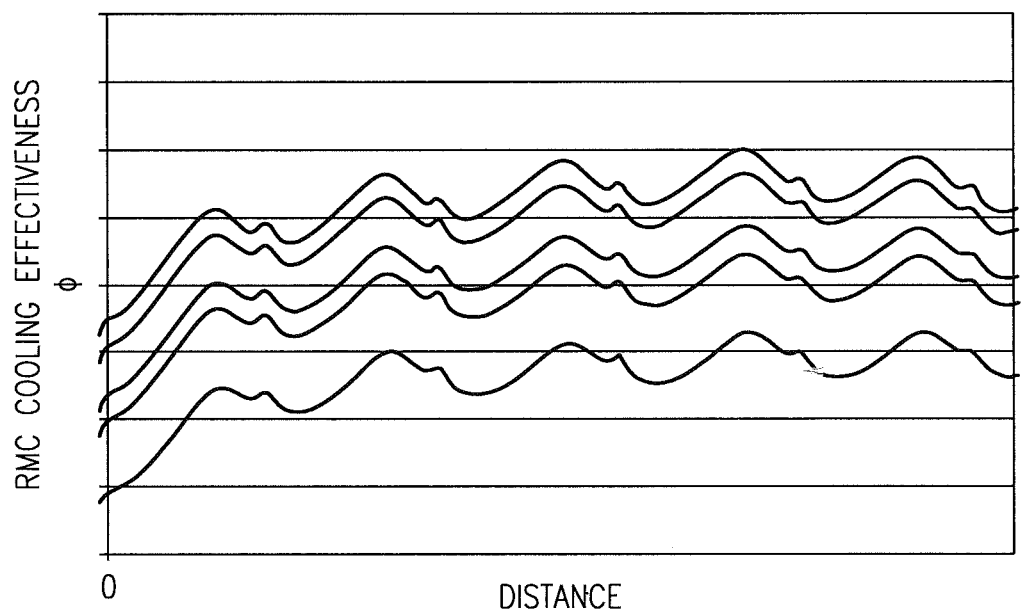
FIG. 12 is a graphical representation of cooling RMC microcircuit effectiveness.

With reference to FIG. 12, cooling effectiveness versus distance for a typical RMC microcircuit is disclosed as a function of coolant flux through the RMC microcircuit. Cooling effectiveness is defined as a dimensionless temperature ratio; wherein a cooling effectiveness of one (1) implies that the metal temperature is the same as the coolant temperature; and a cooling effectiveness of zero (0) implies that the metal temperature is the same as the gas temperature. It can be seen from this Figure that a relatively high cooling effectiveness of approximately 0.6-0.7 is readily achieved. This level of effectiveness competes well with other cooling arrangements, such as impingement cooling, with the further benefit that less airflow is consumed and the airflow may be tailored and controlled to address local hot spot regions to increase overall engine efficiency. In one disclosed non-limiting embodiment, Turbine Cooling Air requirements have been reduced by 10-30% when actually employed.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A combustor section for a gas turbine engine, the combustor section comprising:
    an outer liner panel, an inner liner panel and a bulkhead arranged with the outer and the inner liner panels to form an annular combustion chamber with a longitudinal axis;
    a swirler assembly configured with the bulkhead;
    a combustor vane which extends at least partially into said combustion chamber, wherein the combustor vane extends between a leading edge and a trailing edge, and wherein the leading edge of the combustor vane is circumferentially aligned with a center of the swirler assembly about the longitudinal axis;
    wherein said combustor vane includes a swirler located along the leading edge of the combustor vane; and
    wherein said swirler includes an annular inner jet compartment.

2. The combustor section as recited in claim 1, wherein said combustor vane is located between an outer liner panel and an inner liner panel.

3. The combustor section as recited in claim 1, wherein said combustor vane defines a length between 35%-65% of said combustion chamber.

4. The combustor section as recited in claim 1, wherein said swirler includes a multiple of supply air chambers.

5. The combustor section as recited in claim 4, wherein said annular inner jet compartment includes a convergent-divergent section.

6. The combustor section as recited in claim 5, wherein a divergent portion of said convergent-divergent section communicates with a dilution passage.

7. The combustor section as recited in claim 6, wherein said dilution passage communicates with a dilution hole.

8. The combustor section as recited in claim 7, wherein said dilution hole is located within a tailored depression.

9. The combustor section as recited in claim 8, wherein each of said multiple of supply air chambers communicates with at least one cooling hole located radially between said convergent divergent section and said dilution hole.

10. The combustor section as recited in claim 1, wherein said combustor vane is manufactured of a refractory metal core (RMC) material.

11. The combustor section as recited in claim 10, wherein said combustor vane includes an RMC circuit along a main body of said combustor vane.

12. The combustor section as recited in claim 10, wherein said combustor vane includes centerline RMC microcircuit with pedestals along a trailing edge of said combustor vane.

13. The combustor section as recited in claim 10, wherein said combustor vane includes a multiple of swirlers stacked along a leading edge of said combustor vane.

14. A combustor section of a gas turbine engine, the combustor section comprising:
an outer liner panel, an inner liner panel and a bulkhead arranged with the outer and the inner liner panels to form an annular combustion chamber with a longitudinal axis;
a swirler assembly configured with the bulkhead, the swirler assembly extending axially along a centerline; and
a combustor vane having a swirler, the combustor vane extending between a leading edge and a trailing edge, and the leading edge of the combustor vane circumferentially aligned with the centerline of the swirler assembly about the longitudinal axis;
the swirler comprising:
an annular inner jet compartment which defines a convergent-divergent section; and
a multiple of supply air chambers in communication with said annular inner jet compartment.

15. The combustor section swirler as recited in claim 14, wherein said convergent-divergent section is directed through a leading edge of a combustion vane.

16. The combustor section swirler as recited in claim 14, wherein a divergent portion of said convergent-divergent section communicates with a dilution passage, said dilution passage in communication with a dilution hole radially outboard of said annular inner jet compartment, said dilution hole located within a tailored depression.

17. A combustor section for a gas turbine engine, the combustor section comprising:
an outer liner panel, an inner liner panel and a bulkhead arranged with the outer and the inner liner panels to form an annular combustion chamber, the combustion chamber extending axially along and circumferentially around an axis;
a swirler assembly configured with the bulkhead, the swirler assembly extending axially along a centerline; and
a combustor vane having at least one dilution hole, wherein the combustor vane extends between a leading edge and a trailing edge, and wherein the leading edge of the combustor vane is circumferentially aligned with the centerline of the swirler assembly about the axis;
wherein said combustor vane includes a swirler located along the leading edge of the combustor vane; and
wherein said swirler includes an annular inner jet compartment.

* * * * *